United States Patent [19]
Nishioka

[11] Patent Number: 4,576,435
[45] Date of Patent: Mar. 18, 1986

[54] ENDOSCOPE INCLUDING A REFLECTOR RELATED BY AN INEQUALITY FOR UNIFORM LIGHT DISTRIBUTION

[75] Inventor: Kimihiko Nishioka, Hachioji, Japan

[73] Assignee: Olympus Optical Co., Ltd., Japan

[21] Appl. No.: 513,771

[22] Filed: Jul. 14, 1983

[30] Foreign Application Priority Data

Aug. 5, 1982 [JP] Japan .................. 57-136479

[51] Int. Cl.$^4$ .................................... G02B 23/26
[52] U.S. Cl. .......................... 350/96.26; 350/96.25; 350/96.28; 350/96.24; 128/4; 128/6; 128/395; 128/398
[58] Field of Search ............... 350/96.10, 96.15, 96.18, 350/96.24, 96.25, 96.26, 96.27, 96.28, 444; 128/630, 3, 4, 6, 7, 8, 9, 772, 362, 395, 396, 397, 398

[56] References Cited
U.S. PATENT DOCUMENTS

| | | | |
|---|---|---|---|
| 3,446,952 | 5/1969 | Sitter et al. | 350/96.26 |
| 4,101,196 | 7/1978 | Imai | 350/96.25 |
| 4,350,150 | 9/1982 | Kubota et al. | 350/96.26 |
| 4,415,240 | 11/1983 | Nishioka et al. | 350/96.10 |
| 4,483,585 | 11/1984 | Takami | 350/96.26 |

Primary Examiner—William L. Sikes
Assistant Examiner—Brian M. Healy
Attorney, Agent, or Firm—Ostrolenk, Faber, Gerb & Soffen

[57] ABSTRACT

A light transmitting device includes a light guide formed by a bundle of optical fibres. Light from a light source is passed through a condenser lens to impinge upon the incident end face of the light guide for transmission to the exiting end face thereof. A pipe-shaped reflector is disposed between the condenser lens and the light guide for achieving a uniform distribution of light intensity across the incident end face of the light guide.

5 Claims, 5 Drawing Figures

RADIAL DISTANCE FROM CENTER OF END FACE

ENDOSCOPE INCLUDING A REFLECTOR RELATED BY AN INEQUALITY FOR UNIFORM LIGHT DISTRIBUTION

BACKGROUND OF THE INVENTION

The invention relates to a light transmitting device, and more particularly, to a light transmitting device which may be used in an illumination optical system of an endoscope or the like.

An endoscope includes an optical system which is constructed in a manner as schematically illustrated in FIG. 1. Specifically, the endoscope has a light source assembly 10 including a light source 1 such as lamp, a reflector 1a and a condenser lens 2. Light from the source 1 is condensed by the condenser lens 2 so as to impinge upon an incident end face 3a of a light guide 3 which is formed by a bundle of optical fibres. After passage through the light guide 3, the light emerges from an exit end face 3b to be directed through an illumination lens 4 to irradiate an object 5 being observed. An image of the object 5 can be observed through a path including an observation window 6a, an objective lens assembly 6, an image guide 7, formed by a bundle of optical fibers, and an eyepiece 8.

In the use of light transmitting device as illustrated by the light guide 3 mentioned above in which a number of optical fibers are bundled and bonded together by means of an adhesive, the relatively poor heat resistance of the adhesive may cause the adhesive to be scorched in the region of the incident end face 3a where intensive light from the source 1 impinges in a concentrated manner, causing a "burn-out" of the light guide. Such "burn-out" causes a reduction in the amount of light available for the illumination and causes non-uniformity of the illumination, and thus is unfavorable.

The distribution of the intensity of light which impinges upon the end face 3a of the light guide 3 used in such illumination system is illustrated graphically in FIG. 2. It will be evident from this Figure that the severity of such "burn-out" increases toward the center of the incident end face. This problem is accentuated by the fact that the diameter of the endoscopes has been gradually reduced, requiring a thinner light guide. This in turn makes it necessary to use a light source of higher intensity to maintain an equal amount of light thereby increasing the occurrence of "burn-out".

Another difficulty with the use of such an illumination system employing a light guide such as that shown at 3 relates to the alignment of individual fibres between the incident and the exit end faces 3a, 3b. Thus, if the light which impinges upon the incident end face 3a has a non-uniform distribution of intensity, such distribution is directly transmitted to the exit end face 3b, with result that the light which illuminates the object 5 being observed has a non-uniform distribution. It is also to be noted that a ray of light which emerges in the same direction as the direction of a particular fibre has a greater intensity than any other ray which emerges from the particular fibre. Accordingly, if the incident end and the exiting end of a particular fibre are displaced from each other, the refraction of rays by the illumination lens 4 causes those rays having greater or greatest intensities to be directed to one side of the object 5, as illustrated in FIG. 3, thus also causing non-uniform illumination.

In an attempt to prevent the occurrence of "burn-out" mentioned above, the use of a single fibre, formed by a material which absorbs infrared radiation and disposed between the incident end of the light guide and the light source, or the use of a ventilation cooling technique has been proposed, but such technique fails to eliminate the non-uniform illumination mentioned above.

To eliminate described disadvantages which are experienced with a light guide used as a light transmitting device, it is desirable to cause the light from a light source to impinge upon the incident end face of the light guide in a uniform manner, thus providing a uniform distribution of light intensity across such end face.

SUMMARY OF THE INVENTION

It is an object of the invention to provide a light transmitting device which eliminates disadvantages of the prior art, by disposing a pipe-shaped reflector between a light guide and a condenser lens of a light transmitting device.

In accordance with the invention, any light which passes through a condenser lens and impinges upon the incident end face of a light guide must pass through a pipe-shaped reflector before it reaches the incident end face. In this manner, the light undergoes reflections within the reflector to exhibit a uniform distribution of intensity, which is supplied to the incident end face. Accordingly, a uniform distribution of light intensity across the incident end face is achieved, thus preventing the occurrence of "burn-out" and eliminating the described disadvantages of the prior art. Thus, the invention provides a great contribution to reducing the diameter of an endoscope or the like.

DESCRIPTION OF PREFERRED EMBODIMENT

Figure 1:
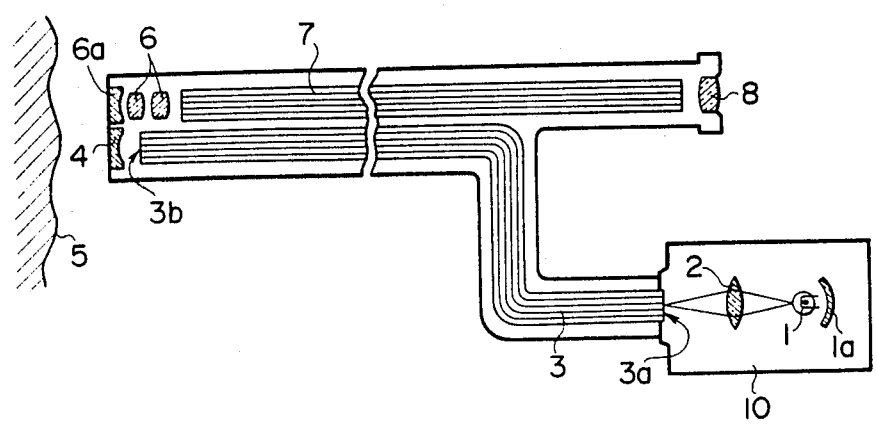
FIG. 1 is a schematic view of an optical system used in an endoscope.
Figure 2:
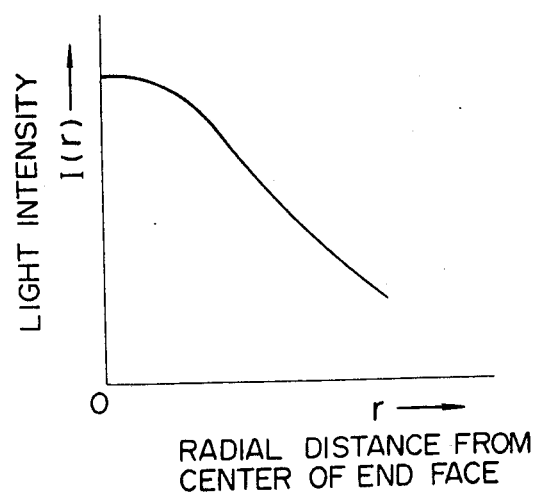
FIG. 2 graphically shows the distribution of light intensity in the radial direction across the incident end face of a light guide used in an endoscope.
Figure 3:
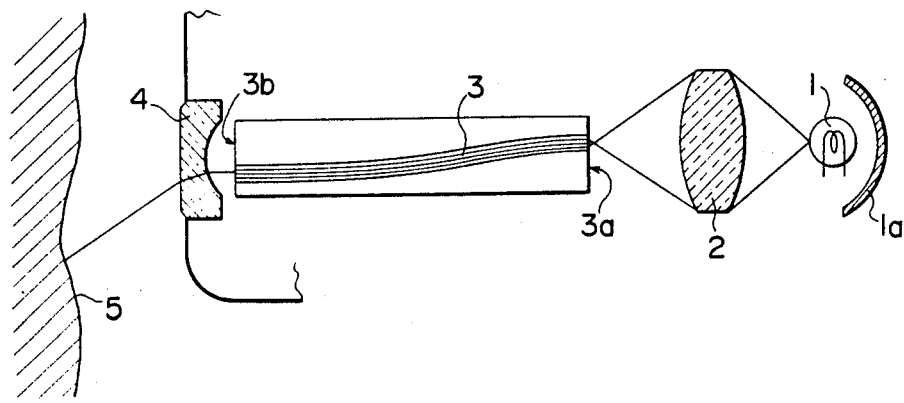
FIG. 3 is a schematic illustration of an illumination optical system, showing the cause of non-uniform illumination which occurs with a conventional light guide of an endoscope.
Figure 4:
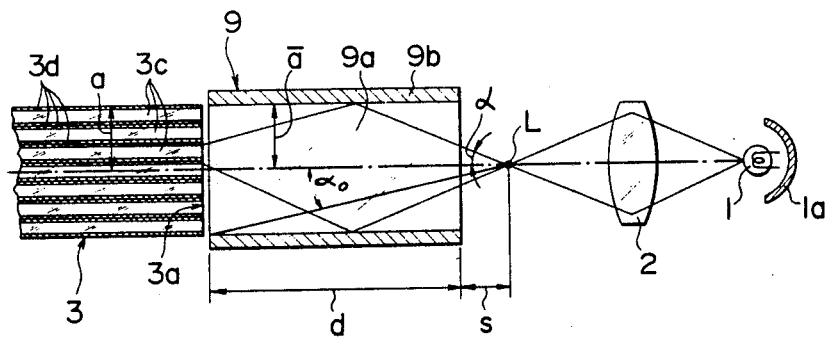
FIG. 4 is an enlarged, fragmentary view of a light transmitting device according to one embodiment of the invention.
Figure 5:
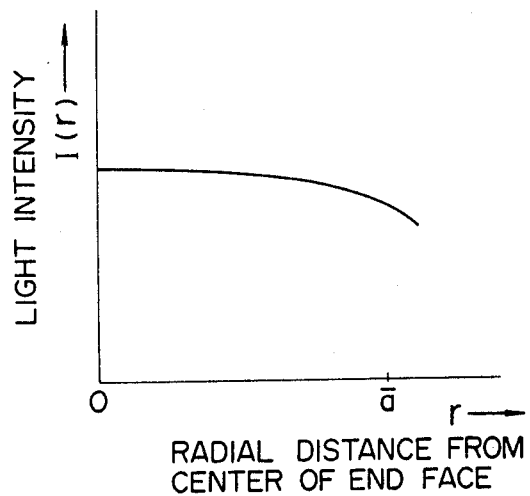
FIG. 5 graphically shows a radial distribution of light intensity across the incident end face of a light guide used in the light transmitting device shown in FIG. 4.

FIG. 4 is an enlarged, fragmentary view of a light transmitting device according to one embodiment of the invention. Parts corresponding to those shown in FIG. 1 are designated by like reference characters. Specifically, illuminating light from a light source 1 passes through a condenser lens 2 to impinge upon a pipe-shaped reflector 9. As shown, the reflector 9 is disposed between the condenser lens 2 and the incident end face 3a of a light guide 3 which comprises a bundle of optical fibres. The reflector 9 is formed by a single fibre including a single member fibre core 9a and a cladding 9b which is coated around the peripheral surface of the core 9a. It is to be noted that the single fibre must be chosen to satisfy certain requirements which will be described later. The use of the single fibre 9 allows light from the source 1 to be rearranged into a uniform distribution as a result of reflections occurring at a boundary surface between the core 9a and the cladding 9b. The resulting distribution of light intensity which occurs at the incident end face 3a of the light guide 3 is graphically shown in FIG. 5. It will be seen that this illustration that a phenomenon that the degree of "burn-out" becomes severe toward the center of the incident end face of the light guide, as occurring in an arrangement of the prior art, is avoided while removing the non-uniformity of the illumination.

For the purpose of discussing the requirements imposed upon the pipe-shaped reflector 9, nomenclatures are chosen as illustrated in FIG. 4 where L represents an image of a bright spot of a source lamp, S a converted air length from the incident end of the single fibre 9 to the bright spot image L (which is assumed to be positive to the left of the incident end and negative to the right thereof), $\bar{a}$ a radius of the fibre core 9a, d the length of the single fibre 9 measured along the optical axis, $\alpha$ an angle formed between marginal ray and the optical axis (where light bundle is not symmetrical with respect to the axis, the minimal value is chosen), and n the refractive index of the fibre core 9a. In order that the light impinging upon the single fibre 9 be uniform at the exiting end thereof, it is necessary that the marginal ray undegoes at least one reflection at the boundary surface between the core 9a and the cladding 9b of the single fibre 9. In other words, the ray must have an angle of incidence $\alpha$ greater than $\alpha_o$, the minimum angle at which the marginal ray must be reflected at least once as it passes through single fibre 9. Therefore, tan $\alpha$ must be greater than tan $\alpha_o$. Assuming that the difference between the refractive indices of the air and fibre core 9a results in negligible bending of the incident ray, tan $\alpha_o = \bar{a}(-S+(d/n))$. This also assumes that $\bar{a}$ is somewhat greater than the wavelength of the light, typically about 0.5 μm which will be true for typical available fibres. Also, d and s are sufficiently short that attenuation is not significant, which will be true even for extremely large d (100–1000 m) if fibre 9 is a quartz and will be true for even larger values of s. For efficiency, however, s should be short enough that a relatively large proportion of incident light from source 1 impinges on fibre 9. In general, therefore, the described parameters must satisfy the following relationship:

$$(-S+(d/n)) \tan \alpha > \bar{a} \qquad (1)$$

The uniformity of light flux is enhanced with an increasing length of the single fibre 9. However, the length is limited to enable a reduction in the size of the arrangement. Light flux having substantially uniform distribution of intensity can be obtained as long as the inequality (1) is satisfied.

Considering the relationship between the diameter of the core 9a of the single fibre 9 and the diameter of the light guide 3, it will be seen that if $a > \bar{a}$ (where a represents the radius of the light guide 3), only part of the light guide 3 is utilized to transmit the light, thus preventing an efficient utilization of the light guide 3. Accordingly, we have to choose $$a \leq \bar{a} \qquad (2)$$

Thus, the diameter of the single fibre 9 must be equal to or greater than the diameter of the light guide 3. When assembling the light guide 3 and the single fibre 9 together, it is difficult to achieve a perfect alignment of the both optical axes. If any eccentricity exists, it is desirable that the core 9a of the single fibre 9 covers the light guide 3. Specifically, representing the eccentricity between the single fibre 9 and the light guide 3 by e, it is necessary that $a + e \leq \bar{a}$. Representing the distribution of light intensity on the incident end face of the single fibre 9 by J(r) (where r represents the radial distance from the center of the single fibre), the total amount of light which passes through the incident end face of the single fibre 9 is given by $$E = \int_0^{\bar{a}} J(r) \cdot 2\pi r \cdot dr$$

Such light is distributed uniformly as it passes through the single fibre 9, producing a light flux of uniform intensity at the exiting end. The amount of light per unit area of the exiting end face of the single fibre 9 is thus given by $$\frac{1}{\pi \bar{a}^2} \int_0^{\bar{a}} J(r) \cdot 2\pi r \cdot dr$$

Hence, the total amount of light $\bar{E}$ which impinges upon the light guide 3 is given by $$\bar{E} = \frac{a^2}{\pi \bar{a}^2} \int_0^{\bar{a}} J(r) \cdot 2\pi r \cdot dr$$

By contrast, if the single fibre 9 does not exist, the total amount of light E which impinges upon the light guide 3 is given by $$E = \int_0^a J(r) \cdot 2\pi r \cdot dr$$

Thus, the quantity ($E - \bar{E}$) represents the light loss which occurs due to the presence of the single fibre 9. In addition, the use of the single fibre 9 involves light loss due to Fresnel reflection of light at the incident and the exiting end. Such reflectivity is expressed as $[(n-1)/(n+1)]^2$, which will be in a range from 0.04 to 0.11 since n has a value on the order of 1.5 to 2.0. In this instance, one reflection occurs at the incident end of the single fibre 9 and another at the exiting end, with result that the light loss due to the Fresnel reflection will be on ther order of 0.08 to 0.22. It is desired that the light loss ($E - \bar{E}$) mentioned above be on the order equal to or less than the light loss due to the Fresnel reflection. Thus, it is desirable that the relationship between a and $\bar{a}$ be such that the following relationship is maintained;

$$\frac{E - \bar{E}}{E} < 0.3$$

However, as a matter of practice, it is mechanically impossible to provide a length of the single fibre 9 which achieves a perfect uniform distribution of light intensity across the exiting end face of the single fibre. Hence, it is sufficient for practical purpose that the following inequality be maintained:

$$\frac{E - \bar{E}}{E} < 0.5 \tag{3}$$

To prevent a loss of light which can be transmitted through the light guide 3, as a result of a total reflection at the boundary surface between the core 9a and the cladding 9b of the single fibre 9, it is necessary that the refractive indices be chosen such that $$\sqrt{n^2 - n_1^2} > \sqrt{n_2^2 - n_3^2} \tag{4}$$

where $n_1$, $n_2$ and $n_3$ represent the refractive index of the cladding 9b, the core 3c and the cladding 3d of the light guide 3, respectively.

As discussed above, by providing the single fibre 9 as a pipe-shaped reflector which satisfies the described reqirements (1) to (4), between the condenser lens 2 and the light guide 3, there can be achieved a uniform distribution of light intensity across the exiting end face of the single fibre. As a consequence, any intensive localized "burn-out" can be prevented in the incident end face of the light guide 3. In addition, the resulting light transmitting device is always capable of providing a uniform illumination if there is any slight eccentricity between the single fibre 9 and the light guide 3 or if the the individual fibres which form the light guide 3 are displaced between the incident and the exiting end.

If the single fibre is formed of an infrared radiation absorbing material, a more favorable result is obtained in respect of avoiding the "burn-out". The cladding may be removed or may be formed by an adhesive. The single fibre hs been used as a pipe-shaped reflector in the described embodiment, but such reflector is not limited thereto, but may comprise a glass rod or a hollow pipe having an internal surface which is finished to provide a total reflection. While the invention has been described above as applied to an illumination optical system of an endoscope, it should be understood that the invention is equally applicable to any other illumination system which incorporates a light guide.

What is claimed is:

1. A light transmitting device comprising: a light guide formed by a bundle of optical fibres, a light source, a condenser lens disposed between the source and an incident end of the light guide, and a pipe-shaped reflector disosed between the condenser lens and the incident end of the light guide such that light from said light source passes through the condenser lens, through the pipe-shaped reflector and then through the light guide, the pipe-shaped reflector satisfying the following inequality:

$$(-S + (d/n)) \tan \alpha > \bar{a}$$

where S represents a distance from the incident face of the pipe-shaped reflector to a point which is conjugate to the source with respect to the condenser lens, d the length of the reflector, n the refractive index of a portion of the reflector which allows the passage of light therethrough, $\bar{a}$ the radius of the portion of the reflector and $\alpha$ the minimum numerical aperture of a light flux which impinges upon the reflector.

2. A light transmitting device according to claim 1 in which the pipe-shaped reflector is chosen so that $a \leq \bar{a}$ where $\bar{a}$ represents the radius of the portion of the reflector which allows the passage of light therethrough and a represents the radius of a portion of the light guide which allows the passage of light therethrough.

3. A light transmitting device according to claim 1 in which representing the total amount of light which impinges upon the light guide through the pipe-shaped reflector by $\bar{E}$ and the total amount of light which impinges upon the light guide in the absence of the reflector by E, the reflector is constructed such that a light loss due to the presence of the reflector satisfies the following relationship:

$$\frac{E - \bar{E}}{E} < 0.5$$

4. A light transmitting device according to claim 1 in which the pipe-shaped reflector is formed by a single fibre comprising a solid cylindrical core and a cladding thereon with a boundary surface therebetween, light from the source which impinges upon the reflector being subject to a reflection at the boundary surface between the core and the cladding, whereby light exiting from the reflector has a uniform distribution of light intensity.

5. A light transmitting device according to claim 4 in which the single fibre is constructed to satisfy the following relationship:

$$\sqrt{n^2 - n_1^2} > \sqrt{n_2^2 - n_3^2}$$

where n, $n_1$, $n_2$ and $n_3$ represent the refractive index of the core and the cladding of the single fibre and the core and the cladding of the light guide.

* * * * *